United States Patent [19]
Hanna

[11] Patent Number: 5,259,040
[45] Date of Patent: Nov. 2, 1993

[54] METHOD FOR DETERMINING SENSOR MOTION AND SCENE STRUCTURE AND IMAGE PROCESSING SYSTEM THEREFOR

[75] Inventor: Keith J. Hanna, Mercer, N.J.

[73] Assignee: David Sarnoff Research Center, Inc., Princeton, N.J.

[21] Appl. No.: 771,715

[22] Filed: Oct. 4, 1991

[51] Int. Cl.$^5$ .............................. G06K 9/36
[52] U.S. Cl. ......................... 382/41; 382/44; 382/54; 358/133; 358/135
[58] Field of Search .............. 382/39, 41, 44, 54, 382/56; 358/133, 135, 136, 105, 125

[56] References Cited

U.S. PATENT DOCUMENTS

4,682,300  7/1987  Seto et al. .................. 382/54
4,835,532  5/1989  Fant ........................... 382/44

Primary Examiner—Jose L. Couso
Attorney, Agent, or Firm—William J. Burke

[57] ABSTRACT

The invention is a method for determining the motion of an image sensor through a scene directly from brightness derivatives of an image pair. A global image sensor motion constraint is combined with the local brightness constancy constraint to relate local surface models with the global image sensor motion model and local brightness derivatives. In an iterative process, the local surface models are refined using the image sensor motion as a constraint, and then the image sensor motion model is refined using the local surface models as constraints. The analysis is performed at multiple resolutions to enhance the speed of the process.

10 Claims, 6 Drawing Sheets

| Resolution | $\Omega$ | T |
|---|---|---|
| . | (.0000,.0000,.0000) | (.3000,-.4000,.5000) |
| 16 x 16 | (.0153,.0843,.0376) | (-.5795,-.2343,.7806) |
| 32 x 32 | (.0000,.0199,.0054) | (-.1660,-.5448,.8219) |
| 64 x 64 | (-.0052,.0059,-.0026) | (-.0481,-.6296,.7755) |
| 128 x 128 | (-.0001,.0009,.0004) | (.0015,-.6148,.7886) |
| 256 x 256 | (-.0002,.0009,.0011) | (.0032,-.6097,.7926) |
| Actual | (-,-,-) | (.0009,-.6391,.7691) |

| Resolution | Ω | T |
|---|---|---|
| . | (.0000,.0000,.0000) | (.0000,.0000,1.0000) |
| 32 x 30 | (.0283,.0089,-.0357) | (.1429,.0714,.9872) |
| 64 x 60 | (.0189,.0065,-.0153) | (.1937,-.0754,.9782) |
| 128 x 120 | (.0001,-.0028,-.0030) | (.2764,-.4356,.8566) |
| 256 x 240 | (.0001,-.0028,-.0031) | (.2811,-.4465,.8495) |

| Resolution | $\Omega$ | T |
|---|---|---|
| . | (.0000,.0000,.0000) | (.0000,.0000,1.0000) |
| 32 x 30 | (.0027,.0039,-.0001) | (-.3379,-.1352,.9314) |
| 64 x 60 | (.0038,.0041,.0019) | (-.3319,-.0561,.9416) |
| 128 x 120 | (.0037,.0012,.0008) | (-.0660,-.0383,.9971) |
| 256 x 240 | (.0029,.0006,.0013) | (-.0255,-.0899,.9956) |

| Resolution | Ω | T |
|---|---|---|
| . | (.0000,.0000,.0000) | (.0000,.0000,1.0000) |
| 32 x 30 | (.0024,.0067,.0030) | (-.0297,-.1034,.9942) |
| 64 x 60 | (.0022,.0062,.0004) | (-.0103,-.1485,.9887) |
| 128 x 120 | (.0022,.0057,.0006) | (.0042,-.1473,.9891) |
| 256 x 240 | (.0020,.0056,.0010) | (.0096,-.1560,.9877) |

Fig. 7 (e)

METHOD FOR DETERMINING SENSOR MOTION AND SCENE STRUCTURE AND IMAGE PROCESSING SYSTEM THEREFOR

The invention is a method for determining the motion of an image sensor through a scene and the structure of the scene from two or more images of the scene. The invention is also a system for determining the motion of the image sensor in the scene and the structure of the scene.

BACKGROUND OF THE INVENTION

Techniques for recognizing pattern shapes of objects graphically represented in image data are known in the art. Further, techniques for discriminating between moving and stationary objects having a preselected angular orientation, or objects having any other predetermined feature of interest, are also known in the art.

A well known technique for locating a single moving object (undergoing coherent motion), contained in each of successive frames of a motion picture of an imaged scene, is to subtract the level value of each of the spatially corresponding image data pixels in one of two successive image frames from the other to remove those pixels defining stationary objects in the given scene and leave only those pixels defining the single moving object in the given scene in the difference image data. Further, by knowing the frame rate and the displacement of corresponding pixels of the single moving object in the difference image data, the velocity of the single moving object can be computed. However, when the image data of the successive frames define two motions, for example a background region which moves with a certain global velocity pattern in accordance with the movement (e.g., translation, rotation and zoom) of the camera recording the scene, the problem is more difficult. In this case, a scene-region occupied by a foreground object that is locally moving with respect to the background region will move in the motion picture with a velocity which is a function of both its own velocity with respect to the background region and the global velocity pattern of the background region itself. The global velocity pattern due to motion of the image sensor can be very complex since it depends upon the structure of the scene.

A problem is to employ, in real time, the image data in the series of successive frames of the motion picture to (1) measure and remove the effects (including those due to parallax) of the global motion and (2) detect and then track the locally-moving foreground object to the exclusion of this global motion. A conventional general image-motion analysis technique is to compute a separate displacement vector for each image pixel of each frame of a video sequence. This is a computationally challenging task, because it requires pattern matching between frames in which each pixel can move differently from one another. More recently, a so-called "majority-motion" approach has been developed for solving the aforesaid problem in real time. This "majority-motion" approach and its implementation are disclosed in detail in the article "Object Tracking with a Moving Camera-an Application of Dynamic Motion Analysis," by Burt et al., appearing in *Proceedings of the Workshop on Visual Motion*, Irvine, Calif., Mar. 20-22, 1989, which is published by The Computer Society of the IEEE. Further, certain improvements of this "majority-motion" approach are disclosed in detail in the article "A Practical, Real-Time Motion Analysis System for Navigation and Target Tracking," by Burt et al., *Pattern Recognition for Advanced Missile Systems Conference*, Huntsville, Nov. 14-15, 1988.

The specific approaches disclosed in these two Burt et al. articles rely on segmenting the image data contained in substantially the entire area of each frame into a large number of separate contiguous small local-analysis window areas. This segmentation is desirable to the extent that it permits the motion in each local-analysis window to be assumed to have only its own computed single translational-motion velocity. The closer the size of each local-analysis window approaches that occupied by a single pixel (i.e., the greater the segmentation), the closer this assumption is to the truth. However, in practice, the size of each local-analysis window is substantially larger than that occupied by a single image pixel, so that the computed single translational-motion velocity of a local-analysis window is actually an average velocity of all the image pixels within that window. This segmentation approach is artificial in that the periphery of a locally-moving imaged object in each successive frame is unrelated to the respective boundary borders of those local-analysis windows it occupies in that frame. If it happens to occupy the entire area of a particular window, the computed single translational-motion velocity for that window will be correct. However, if it happens to occupy only some unresolved part of a particular window, the computed single translational-motion velocity for that window will be incorrect. Nevertheless, despite its problems, the "majority-motion" and other approaches employing segmentation disclosed in the aforesaid Burt et al. articles are useful in certain dynamic two-motion image analysis, such as in removing the effects of the global motion so that a locally-moving foreground object can be detected and then tracked to the exclusion of this global motion.

For many problems in computer vision, it is important to determine the motion of an image sensor using two or more images recorded from different viewpoints or recorded at different times. The motion of an image sensor moving through an environment provides useful information for tasks like moving-obstacle detection and navigation. For moving-obstacle detection, local inconsistencies in the image sensor motion model can pinpoint some potential obstacles. For navigation, the image sensor motion can be used to estimate the surface orientation of an approaching object like a road or a wall.

Prior art techniques have recovered image sensor motion and scene structure by fitting models of the image sensor motion and scene depth to a predetermined flow-field between two images of a scene. There are many techniques for computing a flow-field, and each technique aims to recover corresponding points in the images. The problem of flow-field recovery is not fully constrained, so that the computed flow-fields are not accurate. As a result, the subsequent estimates of image sensor motion and three-dimensional structure are also inaccurate.

One approach to recovering image sensor motion is to fit a global image sensor motion model, to a flow field computed from an image pair. An image sensor motion recovery scheme that used both image flow information and local image gradient information has been proposed. The contribution of each flow vector to the image sensor motion model was weighted by the local image gradient to reduce errors in the recovered image sensor motion estimate that can arise from local ambiguities in image flow from the aperture problem.

There is, however, a need in the art for a method and apparatus to accurately determine the motion of an image sensor when the motion in the scene, relative to the image sensor, is non-uniform. There is also a need in the art for a method and apparatus to accurately determine the structure of the scene from images provided by the image system. A system possessing these two capabilities can then automatically navigate itself through an environment containing obstacles.

SUMMARY OF THE INVENTION

The invention is a method for accurately determining the motion of an image sensor through a scene using local scene characteristics such as the brightness derivatives of an image pair. A global image sensor motion constraint is combined with the a local scene characteristic constancy constraint to relate local surface structures with the global image sensor motion model and local scene characteristics. The method for determining a model for image sensor motion through a scene and a scene-structure model of the scene from two or more images of the scene at a given image resolution comprises the steps of:

(a) setting initial estimates of local scene models and an image sensor motion model;

(b) determining a new value of one of said models by minimizing the difference between the measured error in the images and the error predicted by the model;

(c) resetting the initial estimates of the local scene models and the image sensor motion model using the new value of the one of said models determined in step (b);

(d) determining a new value of the second of said models using the estimates of the models determined in step (b) by minimizing the difference between the measured error in the images and the error predicted by the model;

(e) warping one of the images towards the other image using the current estimates of the models at the given image resolution; and (f) repeating steps (b), (c), (d) and (e) until the differences between the new values of the models and the values determined in the previous iteration are less than a certain value or until a fixed number of iterations have occurred.

The invention is also an image processing system for determining the image sensor motion and structure of a scene comprising image sensor means for obtaining more than one images of a scene; means for setting the initial estimate of a local scene model and an image sensor motion model at a first image resolution; means for refining the local scene models and the image sensor motion model iteratively; means for warping the first image towards the second image using the current, refined estimates of the local scene models and image sensor motion model.

BRIEF DESCRIPTION OF THE DRAWING

FIGS. 7a b, c, d and e show the results for another road sequence.

DESCRIPTION OF THE PREFERRED EMBODIMENTS

Figure 1:
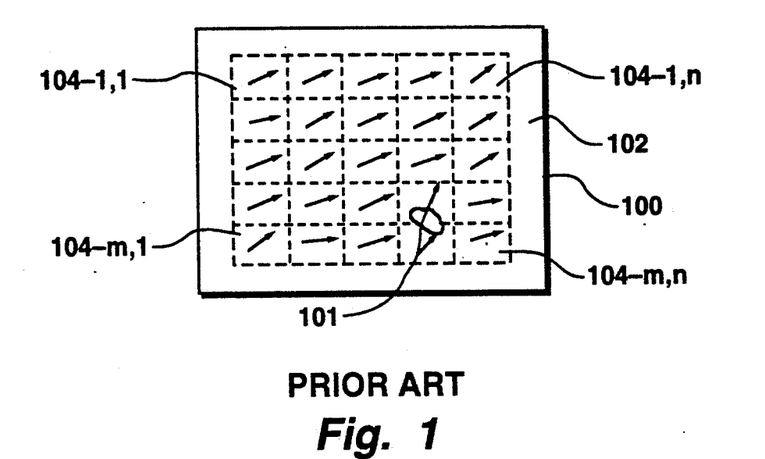
FIG. 1 diagrammatically illustrates the segmentation of a frame area into local-analysis windows employed by the prior-art "majority-motion" approach.
Figure 2:
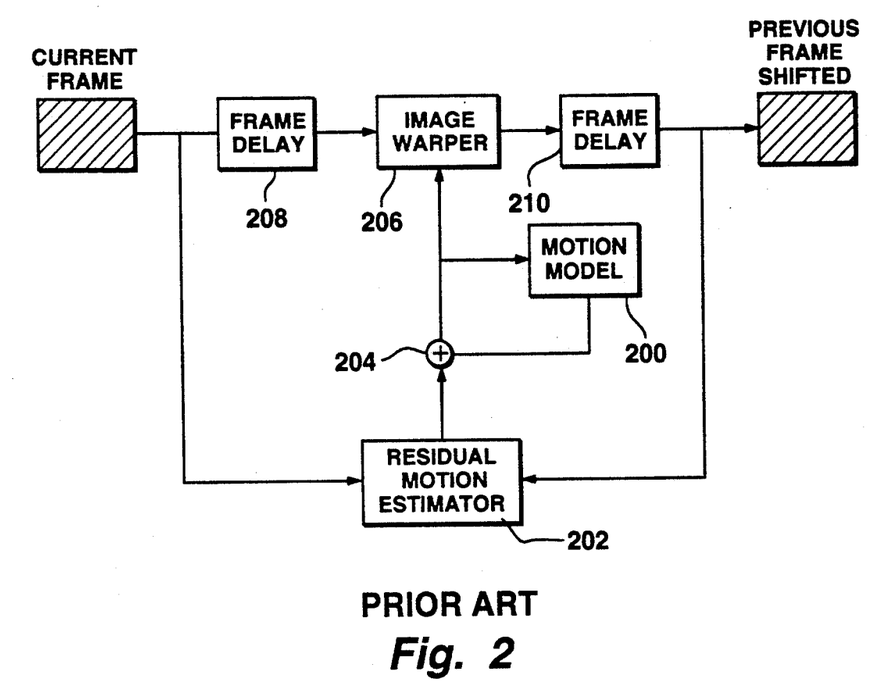
FIG. 2 is a block diagram of a prior-art feedback loop for implementing the prior-art "majority-motion" approach.

FIGS. 1 and 2 illustrate a prior art approach to motion detection which will be helpful in understanding the present invention. In FIG. 1 it is assumed that a moving image sensor (e.g., a video camera) is viewing the ground below from aboard an aircraft in search of an object, such as an automobile, which is locally moving with respect to the ground, for the purpose of detecting the locally-moving object and then tracking its motion with respect to the ground in real time. In this case, the camera produces a sequence of image frames of the ground area at a relatively high rate (e.g., 30 frames per second) so that the area being viewed changes only a small amount between any pair of successive frames. The frame area 100 of each of the successive image frames is divided into a majority region, which is moving at a global velocity determined by the coherent motion of the aircraft, and a minority region occupied by locally-moving automobile 101 on the ground. The frame-area 100 of of each of a pair of successive frames, excluding border-area 102 thereof, is divided into an array of sub-area windows 104-11 . . . 104-$mn$, and the local velocity (designated in FIG. 1 by its vector) for each of these sub-area windows is computed. This may be done by displacing the image data in each sub-area window of one of the pair of successive frames with respect to the image data in its corresponding sub-area windows of the other of the pair of successive frames to provide a match therebetween. Border-area 102 is excluded in order to avoid boundary problems. Further, the image data included in a sub-area window of a frame may overlap to some extent the image data included in an adjacent sub-area window of that frame. In any event, the size of each sub-area window is large compared to the maximum displacement of image data between a pair of successive frames.

The average velocity of all the local velocities is calculated and the size of the difference error between each local velocity and this average velocity determined. In general, these errors will be small and result from such effects as parallax and the fact that the ground viewed by the moving camera is not flat. However, as shown in FIG. 1, the error for those two sub-area windows which include locally-moving automobile 101 is quite large, because the computed velocities therefor include both the global velocity of the moving camera on the aircraft and the local velocity of moving on the ground. Therefore, the two sub-area windows which include locally-moving automobile 101 are excluded by the fact that their respective errors exceed a given threshold, and the average velocity is then recomputed from only the remaining sub-area windows. This recomputed average velocity constitutes an initial estimate of the global velocity of the motion picture due to the movement of the camera. Because only an initial estimate of the global velocity is being derived, the image data of each of the sub-area windows 104-11 ... 104-mn employed for its computation is preferably of relatively low resolution in order to facilitate the required matching of the image data in each of the large number of corresponding sub-area windows 104-11 ... 104-mn of the pair of successive frames.

In FIG. 2 a feedback loop for carrying out the prior-art approach is shown in generalized form. The feedback loop comprises motion model 200 (that is derived in whole or at least in part by the operation of the feedback loop), residual motion estimator 202, summer 204, image warper 206, frame delays 208 and 210, and image data from a current frame and from a previous frame that has been shifted by image warper 206. Residual motion estimator 202, in response to image data from the current frame and from the previous shifted frame applied as inputs thereto, derives a current residual estimate, which is added to the previous estimate output from motion model 200 by summer 204 and then applied as a warp control input to image warper 206. Current-frame image data, after being delayed by frame delay 208, is applied as an input to image warper 206. Image warper 206 shifts the frame-delayed current-frame image data in accordance with its warp-control input, and then frame-delays the output therefrom by frame delay 210 to derive the next previous shifted frame.

The feedback loop of FIG. 2 performs an iterative process to refine the initial estimate of the global velocity to the point that substantially all of that portion of the respective computed sub-area windows velocities of the minority region due to global velocity is eliminated. This iterative process derives the respective local residual velocities of the sub-area windows 104-11 ... 104-mn of each consecutively-occurring pair of successive frames, and then uses each of these residual velocities to derive a current estimate of the residual global velocity. More specifically, the respective local velocities of each pair of successive frames are computed and a current estimate of residual global velocity is made during the each cycle of the iterative process as described above, after the previous estimate of global velocity has, in effect, been subtracted out. In the case of the first cycle, the previous estimate of global velocity is zero, since no previous estimate of global velocity has been made. Therefore, in this case, the residual velocity itself constitutes the initial estimate of the global velocity discussed above.

The effect of this iterative process is that the magnitude of the residual velocities become smaller and smaller for later and later occurring cycles. It is, therefore, preferable that residual motion estimator 202 employ image data of the lowest resolution during the first cycle of the iterative process, and during each successive cycle employ higher resolution image data than was employed during the immediately preceding cycle, in order to minimize the required precision for the matching of the image data in each successive cycle.

Residual motion estimator 202 may comprise hardware and/or software. Several alternative implementation species of residual motion estimator 202 are disclosed in the aforesaid Burt et al. articles. Each of these species provides effective division of the computational burden between general and special purpose computing elements. The first step of ascertaining local motion within the respective sub-area windows is ideally suited for implementation within custom hardware. Data rates are high because the analysis is based on real-time video-rate image data, but processing is simple and uniform because only local translations need be estimated. The second step, in which a global model must be fit to the entire set of of local-motion vectors of all the sub-area windows, is well suited for software implementation in a microprocessor because the computations are relatively complex and global, but the local-motion vector data set is relatively small. Further, as is brought out on the aforesaid Burt et al. articles, the adjustment of the image-data resolution preferably employed in the different cycles of the iteration process, can be efficiently performed by Laplacian and Gaussian pyramid techniques known in the image-processing art as shown for example by Anderson et al in U.S. Pat. No. 4,692,806 and by van der Wal in U.S. Pat. No. 4,703,514.

Burt et al. also describe an improvement of the "majority-motion" approach which employs a foveation technique where, after the each cycle of the above-described iterative process has been completed, only that minority portion of the entire analysis area that has been determined during that cycle not to define the global motion (i.e., automobile 101 is contained within this minority portion) is employed as the entire analysis region during the next cycle of the iterative process. Further, the size of each of the sub-area windows is decreased during each successive cycle, so that the smaller analysis area during each successive cycle can still be divided into the same number of sub-area windows.

This ability in the prior art to determine the motion of an image sensor from analysis of a sequence of image of a scene is needed to enable an image sensor to navigate through a scene. The complexity arises, however, as the sensor moves through the scene, that objects at varying distances and orientation from the sensor (scene-structure) will move with different velocities (both speed and direction). These non-uniformities create substantial complexities in the analysis and necessitate using different techniques other than those disclosed by Burt et al. I have developed a method and apparatus that fits image sensor motion and scene-structure models directly to the images to determine the local scene structure and the global image sensor motion. A global image sensor motion constraint is combined with the local scene characteristic constraint to relate local surface models with the global image sensor motion model and local scene characteristics. In an iterative process, the local surface models are first refined using the image sensor motion as a constraint, and then the image sensor motion model is refined using the local surface models as constraints. The estimates of image sensor motion and scene-structure at a given resolution are refined by an iterative process to obtain increasingly more accurate estimates of image sensor motion and scene-structure; ie. there is a "ping-pong" action between the local model of scene characteristics and the global image sensor model with successive warps of the images to bring them into acceptable congruence with one another. The refinement process starts with estimates of initial image sensor and local scene structure models, estimates from previous frames or any other source of an a priori estimate. This iterative process is then repeated at successively higher resolution until an acceptable accuracy is obtained. Specifically, the models are fitted to an image pair represented at a coarse resolution, and the resultant models are then refined using the same fitting procedure at the next finest resolution.

Image flow is bypassed as the intermediary between local scene characteristic changes and the global image sensor motion constraint. The local scene characteristic constancy constraint is combined with the image sensor motion constraint to relate local-planar or local-constant-depth models with an image sensor motion model and local scene characteristic derivatives. A local-planar model assumes that the scene locally has the shape a flat planar surface, such as a wall. A local-constant-depth surface model is a special case of a local-planar model. It assumes that the flat planar surface is oriented parallel to the surface of rhe sensor. Beginning with initial estimates of the image sensor motion and the local surface parameters, the local surface models are refined using the global image sensor motion model as a constraint. The global image sensor motion model is then refined using the local surface models as constraints.

The following analysis uses changes in the local brightness as the local scene characteristic to illustrate the principles of the invention. Other local scene characteristics include edges, corners, landmarks and other features. The image brightness is related to local surface models and an image sensor motion model as follows. From the first order Taylor's expansion of the brightness constancy assumption, the brightness constraint equation is $$\nabla I^T du + I_t = 0 \tag{1}$$

where $\nabla I^T$ is the gradient vector of the image brightness values, du is the incremental image motion vector, and $I_t$ is the time derivative of the image brightness; values. Using the perspective projection image sensor model and the derivative of the three dimensional position of a moving object, the image motion u of a static object that results from image sensor translation T and image sensor rotation $\Omega$ can be written as $$u = KTZ^{-1} + A\Omega \tag{2}$$

where Z is the depth of the object, $$K = \begin{pmatrix} -f & 0 & x \\ 0 & -f & y \end{pmatrix}, \tag{3}$$

-continued $$A = \begin{pmatrix} \frac{xy}{f} & -\left(f + \frac{x^2}{f}\right) & y \\ \left(f + \frac{y^2}{f}\right) & -\frac{xy}{f} & -x \end{pmatrix}$$

and x, y are image coordinates and f is the focal length of the image sensor.

For a local planar patch model, $$R^T P = 1 \quad R = (X, Y, Z)^T \quad P = (a, b, c)^T \tag{4}$$

where $R^T$ is a point in world coordinates and P defines the orientation and depth of the plane. By combining Eq. 4 with the standard perspective projection equations, x=Xf/Z, y=Yf/Z, and by eliminating X,Y, $$Z^{-1} = F^T P \quad F = (x/f, y/f, 1)^T \tag{5}$$

Inserting Eq. 5 into Eq. 2 gives the image motion in terms of image sensor image sensor motion, local surface orientation and depth:

$$u = KTF^T P + A\Omega \tag{6}$$

From a previous resolution or iteration an estimate of the global image sensor motion parameters, $T_0$, $\Omega_0$, and also an estimate, $P_0$, for each local surface model may exist. Eq. 6 can be used to write an incremental image sensor motion equation:

$$du = (KTF^T P + A\Omega) - u_0 = (KTF^T P + A\Omega) - (KT_0 F^T P_0 + A\Omega_0) \tag{7}$$

where $u_0$ is the image motion corresponding to the previous estimates of the local surface and image sensor motion models. Inserting this incremental image sensor motion equation into the brightness constraint equation (Eq. 1)

$$\nabla I^T KTF^T P + \nabla I^T A\Omega - \nabla I^T KT_0 F^T P_0 - \nabla I^T A\Omega_0 + I_t = 0 \tag{8}$$

The error in this equation is used to refine both the local surface models and the global image sensor motion model. Specifically, the least-: squared error in Eq. 8 is minimized with respect to the local surface parameters over each local region. The least squares error is then minimized with respect to the image sensor motion parameters over all the local regions. In each local image region, the least squares error measure is minimize as follows $$e_{local} = \tag{9}$$

$$\sum_{local} [\nabla I^T KTF^T P + \nabla I^T A\Omega - \nabla I^T KT_0 F^T P_0 - \nabla I^T A\Omega_0 + I_t]^2$$

with respect to P. Differentiating Eq. 9 with respect to $P_{min}$ gives $$de/dP = 2 \sum_{local} \nabla I^T KTF[\nabla I^T KTF^T P + \nabla I^T A\Omega - \nabla I^T KT_0 F^T P_0 - \nabla I^T A\Omega_0 + I_t] \tag{10}$$

At the minimum de/dp is zero and $P_{min}$ is $$P_{min} = \quad (11)$$

$$-G^{-1} \sum_{local} \nabla I^T KTF[\nabla I^T A\Omega - \nabla I^T KF^T P_0 - \nabla I^T A\Omega_0 + I_t]$$

where $$G = \sum_{local} (\nabla I^T T)^2 FF^T \quad (12)$$

The planar patch model is simplified to a constant depth model so that $P=(0,0c)^T$. Eq. 11 then becomes $$c_{min} = -\sum_{local} \nabla I^T KT[\nabla I^T A\Omega - \quad (13)$$

$$\nabla I^T KT_0 c_0 - \nabla I^T A\Omega_0 + I_t/\Sigma_{local}(\nabla I^T KT)$$

where $c_0$ is an estimate of the local depth from a previous scale or iteration.

In the global image region, the minimized least squares error measure is $$e_{global} = \quad (14)$$

$$\sum_{global} [\nabla I^T KTc_{min} + \nabla I^T A\Omega - \nabla I^T KT_0 c_0 - A I^T A\Omega + I_t]^2$$

with respect to T and $\Omega$ where $c_{min}$ for each local region is given by Eq. 13. Eq. 14 is valid only for the local-constant-depth model. As formulated here, the error is quadratic in $\Omega$ but non-quadratic in T, and a non-linear minimization technique is required. In the current implementation of the method, the Gauss-Newton minimization is done using $\Omega$ and $T_0$ as initial starting values. It is to be understood that other minimization techniques can also be used. If initial estimates of $\Omega_0$ and $T_0$ are not available, for example from a previous frame in a sequence, trial translation values are inserted into Eq. 14, solve for $\Omega - \Omega_0$ (in closed form since Eq. 14 is quadratic in $\Omega - \Omega_0$) and choose as our initial estimates the T and $\Omega - \Omega_0$ that give the lowest error in Eq. 14. Preferably the local and global minimization is performed within a multi-resolution pyramid framework.

The invention is method for determining a model for image sensor motion through a scene and a scene-structure model of the scene from two or more images of the scene at a given image resolution comprising the steps of:

(a) setting initial estimates of local scene models and an image sensor motion model;
(b) determining a new value of one of said models by minimizing the difference between the measured error in the images and the error predicted by the model;
(c) resetting the initial estimates of the local scene models and the image sensor motion model using the new value of the one of said models determined in step (b);
(d) determining a new value of the second of said models using the estimates of the models determined in step (b) by minimizing the difference between the measured error in the images and the error predicted by the model;
(e) warping one of the images towards the other image using the current estimates of the models at the given image resolution;
(f) repeating steps (b), (c), (d) and (e) until the differnces between the new values of the models and the values determined in the previous iteration are less than a certain value or until a fixed number of iterations have occurred;
(g) expanding the images to a higher resolution; and
(h) repeating steps (b), (c), (d), (e) and (f) at the higher resolution using the current estimates of the models as the initial starting values.

The invention is also an image processing system for determining the image sensor motion and structure of a scene comprising image sensor means for obtaining one or more images of a scene; means for setting the initial estimate of a local scene model and the motion of the image sensor at a first image resolution; means for warping the first image towards the second image using the current estimates of the local scene models and image sensor motion model at a first image resolution; means for refining all local scene models and refining the image sensor motion model by performing one minimization step; and iteration means for repeating steps (b) and (c) several times.

In the local minimization, the global image sensor motion constraint is constraining the refinement of the surface parameters locally. Conversely in the global minimization, the local constraints provided by local image structures constrain the refinement of the global image sensor motion parameters.

In the first part of the method, the image sensor motion constraint and the local image brightness derivatives are used to refine each local surface parameter c. The incremental image sensor motion equation (Eq. 7) can be rewritten for the simplified local-constant-depth model so that $$du = (KTc + A\Omega) - (KT_0 c_0 + A\Omega_0) \quad (15)$$

At $\Omega = \Omega_0$ and $T = T_0$ $$du_0 = KT_0(c - c_0) \quad (16)$$

where $du_0$ is the incremental motion introduced by an increment in the parameter c. Therefore, the increment in local motion is constrained to lie along a line in velocity space in the direction of vector KTO (the image sensor motion constraint line). The vector $KT_0$ points towards the current estimate of the focus-of-expansion of the image pair.

Within a local region containing a single edge-like image structure, the brightness constraint equation constrains the motion to lie along a line in velocity space in the direction of the edge (perpendicular to $\nabla I$). By combining the image sensor motion and brightness motion constraint, the surface parameter, c, is refined such that the incremental motion introduced by the refinement lies at the intersection of the image sensor motion constraint line and the local brightness constraint line. In this case, a local motion ambiguity arising from the aperture problem has been resolved using only the image sensor motion constraint. However, local motion ambiguities cannot be resolved using the image sensor motion constraint when the image sensor motion constraint line and the local motion constraint line are parallel. In this case, $\Sigma_{local}(\nabla I^T KT_0^2) \approx 0$, and the denominator in Eq. 13 tends to zero. The physical interpretation is that the local edge structure is aligned in the direction of the current estimate of the focus-of-expansion. The local surface parameter cannot be refined reliably because the image sensor motion estimate adds little or no constraint to the local brightness constraint. In the current implementation of the method, the local surface parameter is not refined if the denominator in Eq. 13 is below a threshold.

Within a local region containing a corner-like image structure, both motion components can be resolved from local information and the local brightness constraint constrains the incremental motion to lie at a single point in velocity space. However, the image sensor motion estimate constrains the incremental motion to lie along the image sensor motion constraint line in velocity space. If the point and line intersect in velocity space, then the incremental motion introduced by the refinement corresponds to the point in velocity space. If the point and line do not intersect, then the incremental motion lies between the line and the point in velocity space.

Within a local region containing a single edge-like image structure, the brightness constraint equation (Eq. 1) shows that the error in the equation will remain constant for any du that is perpendicular to the gradient vector ($\nabla I$) of the edge. As a result, only the local motion component normal to the edge is used to refine the global image sensor motion estimate. Since there is no contribution from the motion component along the edge direction, fewer errors in the global image sensor motion estimate are caused by local motion ambiguities arising from the aperture problem.

Within a local region containing a corner-like image structure, both motion components can be resolved from only local information, and both motion components contribute to the refinement of the global image sensor motion estimate.

We use a Gaussian or Laplacian pyramid to refine the image sensor motion estimate and local surface parameters at multiple resolutions. In the pyramid framework, large pixel displacements at the resolution of the original image are represented as small pixel displacements at coarse resolutions. Therefore, the first order Taylor's expansion of the brightness constancy constraint (Eq. 1—approximately true only for small du) becomes valid at coarse resolutions even when the image motion is large at the original resolution. The local depth estimates from previous resolutions are used to bring the image pair into closer registration at the next finest resolution. As a result, the first order Taylor's expansion is to be valid at all resolutions in the pyramid framework, disregarding basic violations in the brightness assumption that will occur at occlusion boundaries, for example. In addition, independently moving objects in the scene will also violate the image sensor motion constraint. Preliminary results have shown that the recovered image sensor motion estimate is not greatly sensitive to such failures in the models.

In the image sensor motion recovery method presented here, the additional change in image brightness introduced by Gaussian or Laplacian blurring within the pyramid have not been determined. The recovered image sensor motion estimates are often similar at each resolution, and the error surfaces computed as a function of image sensor translation using a flow-based, multi-resolution, image sensor motion recovery method are similar at all resolutions.

Figure 3:
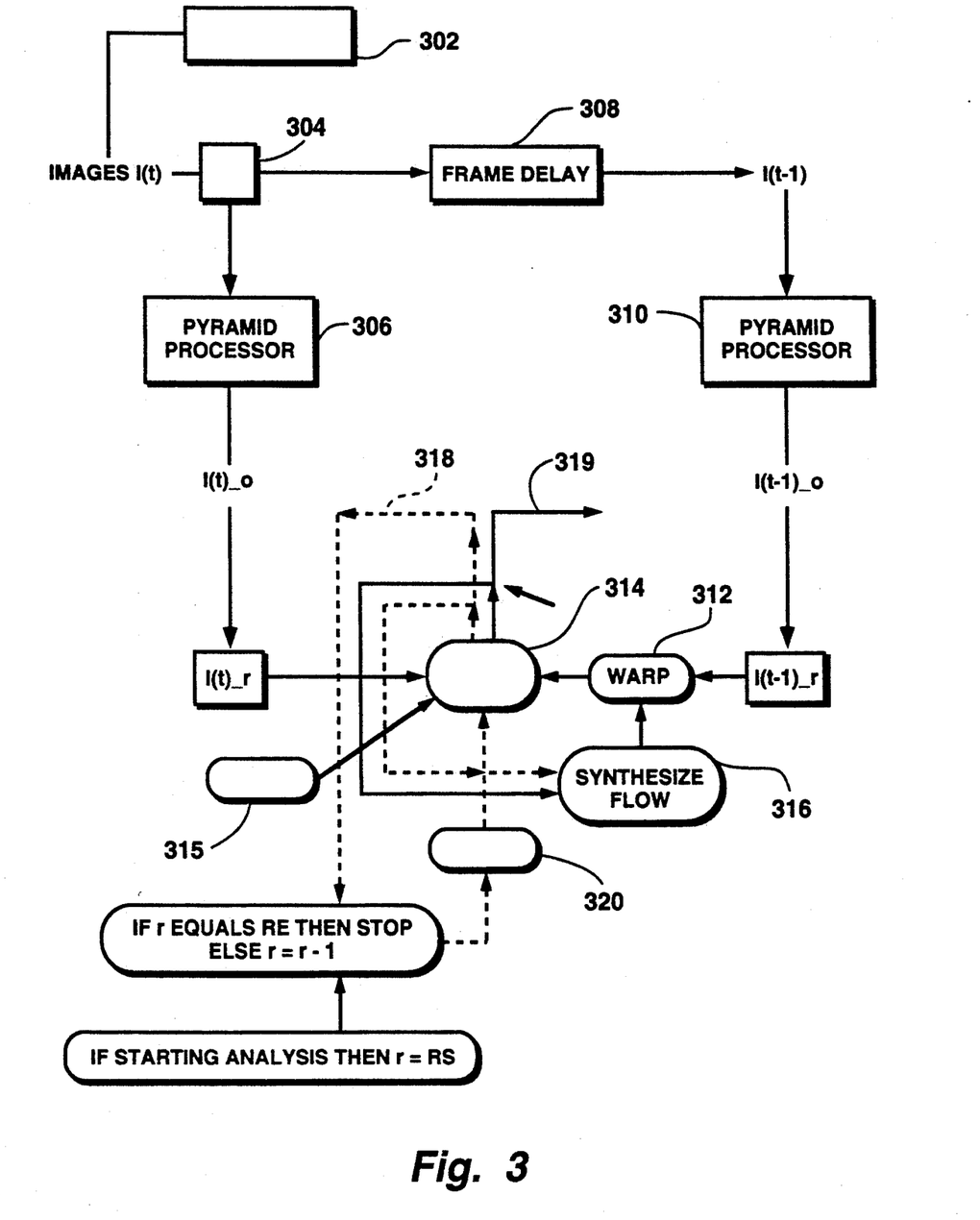
FIG. 3 is a block diagram of a feedback loop for implementing the invention.

In FIG. 3, a feedback loop 300 for implementing the invention comprises an image sensor 302, such as a video camera, whose output is a sequence of images of a scene at a given resolution. Other types of image sensors include radar detectors, optical line sensors or other electromagnetic or sonic detectors or any other source of signals. The images are alternately applied by switch 304 to a first pyramid processor 306 and to a frame delay 308 and then to a second pyramid processor 310. Such pyramid processors are known in the image-processing art as shown for example by Anderson et al in U.S. Pat. No. 4,692,806 and by van der Wal in U.S. Pat. No. 4,703,514. The two pyramid processors have as their output images separated in time by the delay provided by the frame delay 308 and corresponding to the original images but at a resolution e which is typically less than that of the original image. The time delayed image is applied through a warper 312 and then to the estimator 314. While the warper is shown operating on the time delayed image, it can equally operate on the other image. The other image is applied directly to estimator 314. In the estimator 314 the first step the error function for the mismatch between the actual image motion and the models of the image sensor motion and the local scene structure is minimized with respect to each local scene model, keeping the current estimate of the global image sensor motion constant. In the second step the error function for the mismatch between the global image sensor motion and the models of the image sensor motion and the local scene structure is minimized with respect to the global image sensor motion, keeping the current estimate of the local scene models constant. Estimator 314 provides as its outputs estimates of the global motion model and the local scene structure model or local depth model for the images. The initiator 315 provides the initial constraints on the local scene structure and the global motion model to the estimator 314. This information may be embedded in the initiator 315 or may come from another sensor. The outputs of the estimator 314 are new estimates of the global sensor motion and the local scene structure model. These new estimators are then applied to synthesizer 316 which derives a warp-control signal which is applied to warper 312. The warper 312 then distorts the time delayed image, bringing it closer to congruence with the other image. The cycle is then repeated until the required number of iterations have been completed or the differences between the two images has been reduced below a certain value. The local depth model information is then available at port 318 and the global motion model information is available at 319. The images are then recalculated at a higher resolution and the iterative cycle is repeated. This sequence of iteration at a given resolution level and iteration at successively higher resolutions is repeated until the differences in the models between successive iterations is less than a certain value or a sufficient level of resolution RE has been attained.

The image sensor motion method was tested on both natural and computer-rendered image sequences. The motion in the image sequences ranges from about 4 to 8 pixels at the original resolution, so that analysis at only the original resolution will be inaccurate since the motion will be outside the range of the incremental motion estimator. In the results presented here, four resolutions are used. $T=(0,0,1)^T$ and $\Omega=(0,0,0)^T$ are used as the initial image sensor motion estimate, unless stated otherwise. All local inverse depth estimates are initialized to zero.

Results of the method are shown on computer-rendered images that have size 256×256 pixels, and also on natural images that have size 256×240 pixels. A Laplacian pyramid was used to produce reduced-resolution images of size 128×128, 64×64 and 32×32 pixels for the computer-rendered images, and size 128×120, 64×60 and 32×30 pixels for the natural images. We fit the local surface models to 5 ×5 pixel windows centered on each point in the image, and the image sensor motion model is fitted to each point in the image. For example, as part of a vehicle navigation system, analysis would be restricted to a number of larger local windows directed purposively at image regions like the road ahead or an oncoming object. The global image sensor model is fitted to each point in the image.

We have found that the method can converge to an incorrect solution or fail to converge when analysis begins at a very coarse resolution (corresponding to 16×16 pixels for the image sizes presented here). This behavior may result from excessive blurring of the image intensities at very coarse scales, and also from the limited number of sample points at very coarse resolutions.

Figure 4:
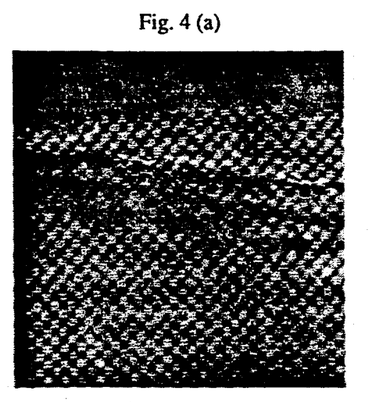
FIG. 4a shows an image pair which have been synthesized and resampled from a known depth map and known image sensor motion parameters.
FIG. 4b shows the difference image between the original image pair.
FIG. 4c shows the image of the local surface parameters (inverse depths) such that bright points are nearer the image sensor than dark points.
FIG. 4d shows the different image between the two images after motion compensation.
FIG. 4e shows the recovered image sensor motion at each resolution and also the actual image sensor motion.

FIG. 4a shows an image pair which have been synthesized and resampled from a known depth map and known imge sensor motion parameters. For this image pair, an initial image sensor motion estimate was recovered by sampling 17×17=289 translation values at the coarsest resolution. FIG. 4b shows the difference image between the original image pair. FIG. 4c shows the image of the local surface parameters (inverse depths) such that bright points are nearer the image sensor than the dark points. The bottom portion of the image shows a surface sloping away from the camera towards a ridge at which point the depth changes rapidly. The very top of the image shows the parameters recovered at a blank portion of the image where there is no texture. FIG. 4d shows the difference image between the second image and the first image after motion compensation. Note that there are few intensity differences indicting that the model has succesfully been fit to the image pair. In the foregoing portion of the scene, the rms error in the estimated depths is approximately 1%. In the background portion of the scene (just over the ridge) the error is much larger, and measurement in a 100×15 window gives an rms error of approximately 8%. This difference is explained by observing that in both regions the difference between the actual motion and the recovered motion is approximately 0.05–0.1 pixels, whereas the actual motion is approximately 4-8 pixels in the foregoing, and approximately 1 pixel in the background. We expect such accuracy in the recovered motion in the foreground and background portions of the image since the image is heavily textured there, but there are large errors in the recovered depth and motion at the very top of the image where there is no texture at all.

FIG. 4e shows the recovered image sensor motion at each resolution and also the actual image sensor motion. The estimate of the image sensor motion components at the final resolution is very close to the actual image sensor motion of the camera despite an occlusion boundary across the center of the image where the brightness constancy assumption is violated. In general, the least squares minimization technique should be sensitive to measurement outliers that might be introduced by such deviations in the model. Similar robustness to measurement outliers has also been observed in other motion fitting techniques that use the same incremental motion estimator (Eq. 1) within the same coarse-fine analysis framework.

Figure 5:
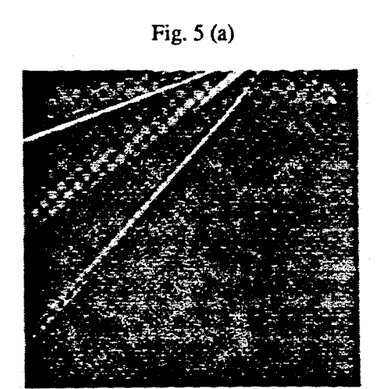
FIG. 5a shows the second image of a natural image pair where the image center has been estimated, and wherein the precise image sensor motion is unknown.
FIG. 5b show the difference image between the original image pair.
FIG. 5c shows inverse depth image recovered at the finest resolution.
FIG. 5d shows the difference image between the two images after the motion compensation.
FIG. 5e shows the computed image sensor motion at each resolution

FIG. 5a shows the second image of a road sequence where there is less image texture, where the image center has been estimated, and where the camera motion is unknown. The image motion is the foreground is approximately 9 pixels towards the image sensor. FIG. 5b shows the difference image between the original images. Note there are few differences except in the foreground and at the top left hand corner of the image. FIG. 5c shows the inverse depth image recovered at the finest resolution. In this case the inverse depth parameters are more noisy since there are fewer features in the image. The depth parameters are plausible near the drain-hole in the image foreground, but are not plausible along most the white line to the left of the image since the image structure in parallel to the load egomotion constrain line given the vehicle's motion. FIG. 5d shows the difference image between the second and the first image after motion compensation. Note that there are few intensity differences despite the errors in the recovered depths.

Figure 6:
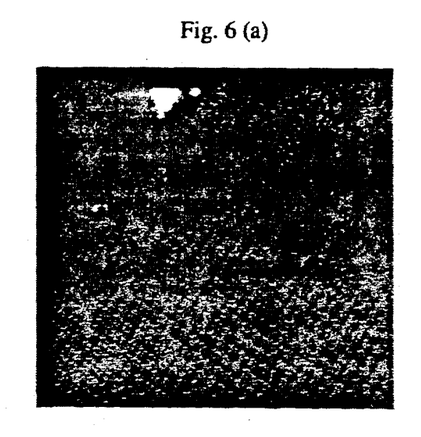
FIGS. 6a–e show the results for a dirt-track road sequence.

FIG. 6a shows the second image of a natural image pair where the image center has been estimated, and where the precise image sensor motion is unknown. The image motion in the foreground is approximately 5 pixels towards the image sensor, FIG. 6b shows the difference image between the two original images. FIG. 6c shows the inverse depth image recovered at the finest resolution. The recovered depths ate plausible almost everywhere except at the image border and near the recovered focus of expansion (near the gate at the image center). The bright dot at the bottom right hand side of the inverse depth map corresponds to a leaf in the original image that is blowing across the ground towards the image sensor. We might expect such plausible results from a scene that is heavily textured almost everywhere. FIG. 6d shows the difference image between the second and first images after motion compensation. FIG. 6e shows the computed image sensor motion at each resolution. The initial image sensor motion estimate is close to the estimates recovered at the two finest scales, yet the recovered estimates are different at the two coarsest resolutions. At these coarse resolutions, the minimization procedure followed a low-gradient, incorrect direction in the error surface that led to the incorrect estimates. While this shows how the estimation procedure can recover from following the incorrect, minimization path, it also shows how thw error surfaces can differ very slightly between resolutions due to differences introduced by image blurring.

Figure 7:
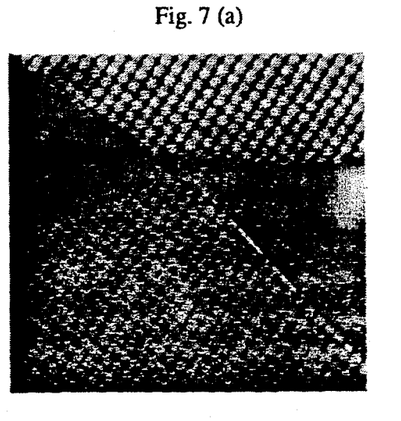

FIG. 7 presents the results for another road sequence. In this case the recovered solutions remain close to the initial image sensor motion estimate. The inverse depth parameters corresponding to the top portion of the image (sky) are clearly incorrect, and in fact the local surface parameters should probably not be refined in image regions containing such small gradients, but for the same reason, such regions have minimal effect on the recovered image sensor motion estimate. We determined that the focus of expansion to lie at the end of the visible portion of the road, at the road center.

An iterative, multi-resolution method that estimates image sensor motion directly from image gradients in two images, and how constraints from different local image structures interact with the image sensor motion constraint is disclosed. The image sensor motion and depths were recovered quite accurately in the computer rendered example, and the recovered image sensor motion and depths appeared plausible in the natural image sequences where ground truth was unavailable.

The main advantages of the multi-resolution analysis disclosed here over existing single-resolution analyses are:

a) Increased range of motion: At the resolution of the original image, limitations on the fitting model means that motions of greater than approximately 1 image pixel cannot be measured accurately. Using multi-resolution analysis, our range of motion is increased to approximately 16 pixels (or more) at the resolution of the original image. This allows the image sensor motion and scene-structure recovery methods to be used for applications in which single-resolution analysis would not work. In fact, image disparity or image motion is greater than a pixel in many, if not most, applications.

b) Accuracy of motion estimates: Because results from previous resolutions are used to update image sensor motion and scene-structure estimates at the next finest resolution, the estimates of image sensor motion and scene structure at the finest resolution (the resolution of the original images) are significantly more accurate than in single-resolution analysis where estimates are computed only at the resolution of the original images without refining previous estimates.

c) Efficiency of method: At coarse resolutions, the representation of the image is small so the method runs very quickly at such resolutions. We can stop processing at a coarse resolution if our refined estimates of image sensor motion and scene-structure are sufficiently accurate for a particular task. Compared to single-resolution analysis, therefore, there is flexibility in trading hardware resources and/or computing power versus accuracy of the image sensor motion and scene-structure estimates.

In summary, because of multi-resolution refinement (as well as single resolution refinement) of the depth and image sensor motion estimates, the warped depth approach is much more accurate than alternative approaches; because of multi-resolution analysis, the allowable range of motion over which the method works is much greater than many alternative methods. As a result, the warped depth method can be used in many applications where alternative methods cannot be used and the method is efficient. As a result, real-time implementation in hardware and software is relatively simple.

The image sensor motion and scene-structure models do not have to be fitted to the entire images; specific regions can be selected and processing is only performed in those regions. The coarse-fine resolution refinement of image sensor motion and scene-structure estimates can be extended to include refinement over time; that is refine the estimates over an image sequence rather than just an image pair. This method can be applied to many problems that require estimation of scene-structure and/or image sensor motion from two of more image pairs. Applications include vehicle navigation, obstacle detection, depth recovery and image stabilization.

The method disclosed here made use of local image brightness and image brightness derivatives as the local scene characteristic or constraint. It is understood that other image characteristics can also be used in the method of the invention. It is also understood that methods other than pyramid processing for expanding the local local scene characteristic characteristics into a higher resolution can be used.

I claim:

1. A digital image-processing method employing a feedback loop, which method, in response to a sequence of successive pairs of image frames in digital form which image frames depict a globally-moving scene in which a certain structural image characteristic of said scene changes with both said global motion and any intrinsic change in local structure of said scene, determines at least one of (1) the actual value of said global motion and (2) the actual local changes in said scene's intrinsic structure; wherein said feedback loop comprises estimate means, synthesize-flow means having an output of said estimate means applied as an input thereto, and warp means having an output of said synthesize-flow means applied as a warp-control input thereto and an output therefrom applied as a first input to said estimate means; and wherein said method comprises the steps of:

a) applying, at a given resolution, the image structure of one image frame of each of said successive pairs through said warp means as said first input to said estimate means;

b) applying, at said given resolution, the image structure of the other image frame of each of said successive pairs directly as a second input to said estimate means;

c) initially storing in said estimate means respective preliminary estimates of the values of said global motion and of said intrinsic changes in said local structure d) employing said estimate means to modify a certain one of the estimates of the value of said global motion and of said intrinsic changes in said local structure currently stored therein to that stored estimate of said certain one of the estimates that results in the difference between the measured changes in image structure defined by the first and second inputs actually applied to said estimate means by steps (a) and (b) and a prediction of these changes in image structure computed from said stored estimates being minimized, thereby deriving as an output from said estimate means a modified stored estimate of certain one of said stored estimates and the currently-stored estimate of said other of said stored estimates;

e) employing said synthesize-flow means to derive a warp-control input to said warp means determined by said output from said estimate means that is applied as an input to said synthesize-flow means, whereby the image structure of said one image frame of each of said successive pairs that is applied through said warp means as said first input to said estimate means by step (a) is warped in accordance with said warp-control input to said warp means to closer correspond to the image structure of said other image frame of each of said successive pairs applied directly as said second input to said estimate means by step (b);

f) employing said estimate means to modify the other of the estimates of the value of said global motion and of said intrinsic changes in said local structure currently stored therein to that stored estimate of said other of the estimates that results in the difference between the measured changes in image structure defined by the first and second inputs actually applied to said estimate means by steps (a) and (b)

and a prediction of these changes in image structure computed from said stored estimates being minimized, thereby deriving as an output from said estimate means a modified stored estimate of said other of said stored estimates and the currently-stored estimate of said certain one of said stored estimates; and g) repeating step (e).

2. In the method defined in claim 1, wherein:
said global motion is said certain one of said stored estimates.

3. In the method defined in claim 1, wherein:
said intrinsic changes in said local structure is said certain one of said stored estimates.

4. In the method defined in claim 1, further comprising the step of:
h) iteratively repeating steps (c) to (g) until said modified stored estimate of said certain one of said stored estimates derived in a step (d) iteration is substantially the same as the currently-stored estimate in that step (d) iteration, or until a given maximum number of iterations have taken place.

5. In the method defined in claim 4, wherein said given resolution of the image structure of said one image frame and said other image frame of each of said successive pairs is lower than an initial resolution of the image structure of said one image frame and said other image frame of each of said successive pairs; comprising the further steps of:
i) substituting a higher-resolution image structure of said one image frame and said other image frame of each of said successive pairs than said given-resolution image structure for said given-resolution image structure; and
j) repeating steps (a) to (h) for said substituted higher-resolution image structure of said one image frame and said other image frame of each of said successive pairs.

6. In the method defined in claim 1, further comprising the step of:
h) iteratively repeating steps (d) to (g) until both said modified stored estimate of said certain one of said stored estimates derived in a step (d iteration is substantially the same as the currently-stored estimate in that step (d) iteration and said modified stored estimate of said other of said stored estimates derived in a step.(f) iteration is substantially the same as the currently-stored estimate in that step.(f) iteration, or until a given maximum number of iterations have taken place.

7. In the method defined in claim 6, wherein said given resolution of the image structure of said one image frame and said other image frame of each of said successive pairs is lower than an initial resolution of the image structure of said one image frame and said other image frame of each of said successive pairs; comprising the further steps of:
i) substituting a higher-resolution image structure of said one image frame and said other image frame of each of said successive pairs than said given-resolution image structure for said given-resolution image structure; and
j) repeating steps (a) to (h) for said substituted higher-resolution image structure of said one image frame and said other image frame of each of said successive pairs.

8. In the method defined in claim 1, wherein:
said certain structural image characteristic is image-pixel brightness at at said given resolution of said image.

9. Digital image-processing apparatus responsive to a sequence of successive pairs of relatively-high resolution image frames in digital form which image frames depict a globally-moving scene in which a certain structure image characteristic of said scene changes with both said global motion and any intrinsic change in local image structure of said scene, wherein said apparatus comprises:
first and second pyramid processors;
first means including a switch and a frame delay for applying at said relatively-high resolution a certain ordinal one of the two image frames of each of said successive pairs directly as an input to one of said first and second pyramid processors and for applying at said relatively-high resolution the other ordinal one of the two image frames of each of said successive pairs through said frame delay as an input to the other of said first and second pyramid processors, whereby each of said first and second pyramid processors is capable of reducing the relatively-high resolution of each image frame applied to its input to a given relatively-high resolution at its output; and
a feedback loop comprising estimate means having first and second inputs and an output indicative to respective estimates of the value of said global motion and of said intrinsic changes in said local structure stored therein, synthesize-flow means having said output of said estimate means applied as an input thereto, and warp means having an output of said synthesize-flow means applied as a warp-control input thereto and an output therefrom applied as a first input to said estimate means;
second means for applying one of the outputs of said first and second pyramid processors as said first input of said estimate means through said warp means for directly applying the other of said outputs of said first and second pyramid processors as said second input of said estimate means;
wherein said estimate means is capable of using the two current estimates stored therein to first compute from the image structure directly applied to its second input a prediction of the image structure applied to its first input, and then modify a selectable one of said two stored current estimates to minimize the difference between the measured changes in image structure defined by the first and second inputs actually applied to said estimate means and said computed prediction of these changes in image structure;
wherein said synthesize-flow means derives a warp-comtrol input to said warp means, determined by said output from said estimate means, which causes the image structure applied through said warp means as said first input to said estimate means to be warped in accordance with said warp-control input to closer correspond to the image structure applied directly as said second input to said estimate means; and
third means for initially storing respective preliminary estimates of the value of said global motion and of said intrinsic changes in said local structure in said estimate means.

10. The apparatus defined in claim 9, wherein:
each of said first and second processors is capable of selectively providing at its output each image frame applied to its input at said given relatively-low reduced resolution or, alternatively, at a predetermined resolution that is higher than said given relatively-low resolution and is lower than or equal to said relatively-high resolution.

* * * * *